Feb. 14, 1933.   G. RAYMOND   1,897,398
INVERSE VALVE CONTROL FOR LIQUID AND GAS SEPARATORS
Filed Aug. 31, 1931
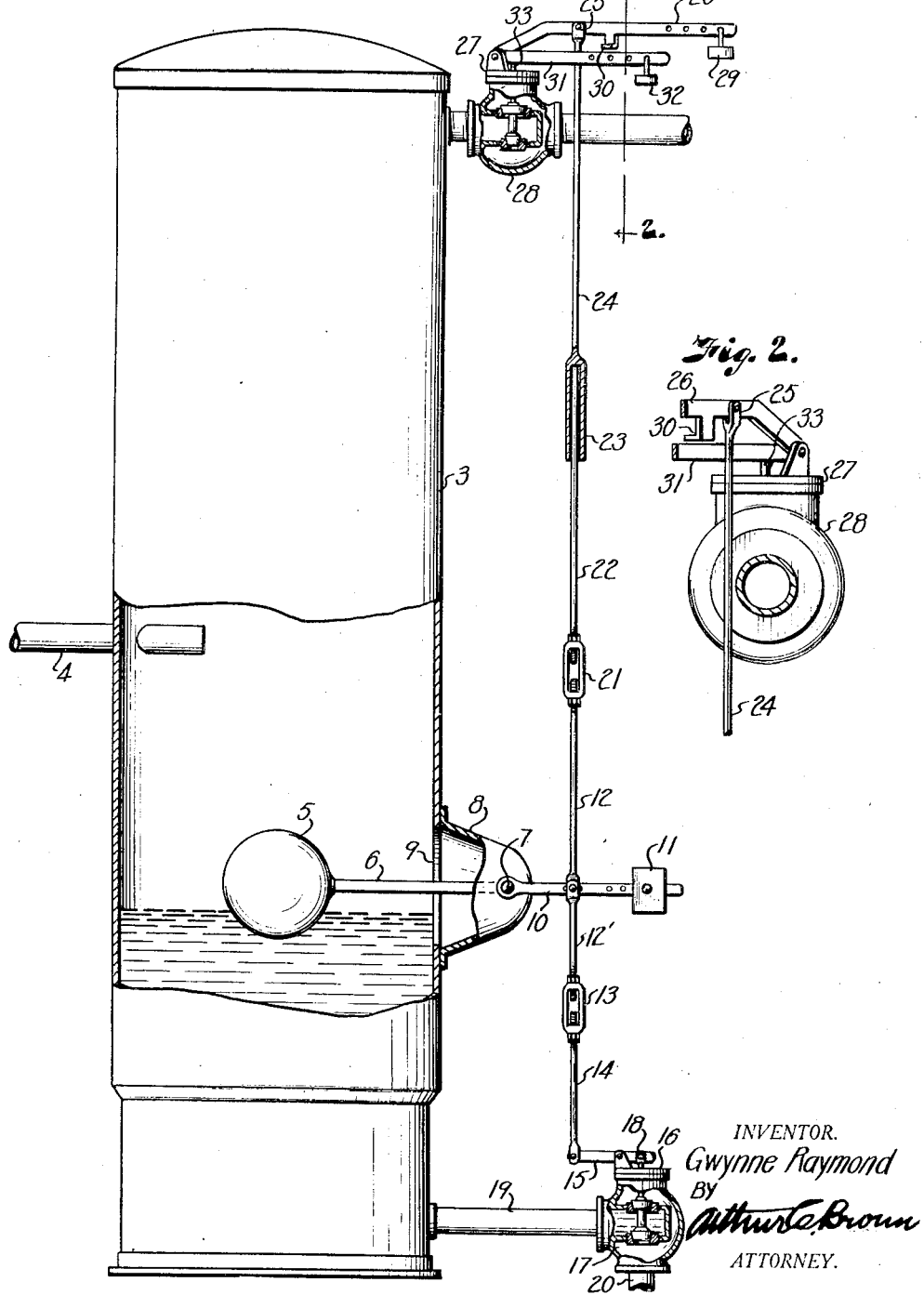
INVENTOR.
Gwynne Raymond
BY
Arthur E. Brown
ATTORNEY.

Patented Feb. 14, 1933

1,897,398

UNITED STATES PATENT OFFICE

GWYNNE RAYMOND, OF KANSAS CITY, MISSOURI

INVERSE VALVE CONTROL FOR LIQUID AND GAS SEPARATORS

Application filed August 31, 1931. Serial No. 560,376.

My invention relates to liquid and gas separators and more particularly to an inverse valve control for controlling the liquid and gas discharged therefrom. In separators now in use the liquid valve is controlled by the level of liquid in the separator and the gas valve is independently operable by pressure accumulating in the separator or, the liquid and gas valves are both controlled inversely by the level of the liquid. The first arrangement has the advantage of providing for escape of gas in proportion to the volume entering the separator. The second arrangement has the advantage of building up the gas pressure in the tank to assist in pressure discharge of the liquid, but such an arrangement is extremely dangerous when the separator is used in high pressure high volume oil fields because a sudden rush of oil and gas into the separator beyond the separator's capacity might occur at any time to raise the oil level and cause the float to shut the gas valve. If this rush of oil were accompanied by a large volume of gas, the pressure in the separator might mount dangerously high, and before enough oil could be forced out through the oil valve to relieve this pressure, serious damage might result, since no adequate provision is made to care for sudden rushes of gas when the gas valve is closed by the float.

This type of valve control is also hazardous because when the gas valve is closed the gas pressure may be sufficient to cause submergence of the float which will close the oil valve and cause flooding of the separator.

It is therefore the principal object of my invention to overcome these objections of the inverse type of control by arranging the gas valve so that it will open automatically under a predetermined minimum gas pressure when the oil level is low and open automatically under a predetermined maximum gas pressure when the oil level is high.

In accomplishing these and other objects of my invention, I have provided improved details of structure, the preferred forms of which are illustrated in the accompanying drawing, wherein:

Fig. 1 is a side elevation of a liquid and gas separator with my device attached thereto, parts being broken away and in section, and Fig. 2 is an enlarged section taken on the line 2—2, Fig. 1, showing the gas valve and the parts of its control.

Referring to the drawing:

3 represents the tank of an ordinary liquid and gas separator, which is provided with the usual liquid and gas inlet pipe 4 which leads from a source of liquid and gas supply.

Located within the tank 3 is a float 5 which is mounted on the end of a lever 6. The lever projects through the wall of the tank and is secured at its opposite end to a shaft 7 which is rotatably carried by a bonnet or cap 8 which covers the opening 9 formed in the tank wall.

The shaft 7 has one end protruding from one side of the cap 8 and to this protruding end is firmly secured one end of a lever 10. The lever 10 has a counter weight 11 adjustably mounted thereon and has rods 12 and 12' pivotally secured thereto.

The rod 12' is connected by a turnbuckle 13 to a rod 14 that is pivotally secured to a lever 15 which is pivotally mounted intermediate its ends on the bonnet 16 of the liquid valve housing 17. The opposite end of the lever 15 is pivotally connected to the valve stem 18. The valve housing 17 is connected to the tank 3 by a pipe 19 and is also provided with an outlet pipe 20. While I have disclosed a valve of the balanced type, I do not desire to be limited thereto as any commercial valve suitable for my work may be employed.

The upper end of the rod 12 carries a turnbuckle 21 which is also secured to the lower end of a rod 22. The upper end of this rod is slidably mounted in a sleeve 23 carried by the lower end of a rod 24. The upper end of the rod 24 is preferably bifurcated as at 25 and is pivotally secured intermediate the ends of the maximum pressure control lever 26.

One end of the maximum pressure lever 26 is pivotally mounted on the bonnet 27 of the gas valve housing 28. A counter weight 29 is adjustably carried at the free end of the lever 26. The lever 26 is also provided with a downwardly extending projection or foot 30 which is designed to contact with the minimum pressure lever 31 under certain conditions to be explained later.

The lever 31 is also pivotally mounted at one end on the bonnet 27, the same pivot as that for the lever 26 being preferably used. The lever 31 is also provided with an adjustable counter weight 32 which is designed to cause the lever 31 to exert the minimum pressure on the valve stem 33 and thus control the minimum gas pressure within the tank.

The turnbuckle 13 forms an adjustable connection between the levers 10 and 15, and the turnbuckle 21 an adjustable connection between the rods 12 and 22.

The operation of my device is as follows: Assuming the tank 3 to be empty, the first step is to set the gas valve to operate at predetermined minimum and maximum pressures. This is done by adjusting the counter weight 32 on the lever so as to give the desired minimum gas pressure. The counter weight 29 is adjusted to the maximum pressure less the minimum pressure. The counter weight 11 is adjusted on the lever 10 so that its weight, together with the downward pull of the lever 26 on the connecting rods 12, 22 and 24, will almost balance the downward pull of the float 5 and lever 6. The turnbuckle 21 is adjusted so that the stop arm 30 will contact the lever 31 when the oil in the separator raises the float to the predetermined high level.

The liquid containing gas is then admitted to the tank 3 where the gas is separated from the liquid. The gas rising to the upper portion of the tank, and the liquid gathering in the lower portion flow into the pipe 19 until it is halted by the liquid valve. As the liquid level in the tank 3 rises, it will raise the float 5, swinging the lever 10 downwardly and open the liquid valve, permitting the liquid to flow to a suitable storage tank. During the downward swing of the lever 10 the maximum pressure lever 26 is also lowered but the turnbuckle 21 is so adjusted that the foot 30 will not contact with the minimum pressure lever 31, thus leaving the gas valve, which may also be termed a blow-off valve, to open under a minimum pressure, and in this way the liquid will normally be forced from the tank under the minimum pressure.

Should the liquid level within the tank be raised by a sudden influx of liquid, the float 5 will rise, lowering the rods 12 and 22. This will move the upper end of the rod 22 downwardly in the sleeve 23 and permit the foot 30 of the lever 26 to contact the lever 31, placing an additional pressure on the gas or blow-off valve, thus permitting a higher gas pressure to build up and assist in restoring the normal liquid level in the tank, and when this level is restored and the float has descended to its normal position, the lever 26 is again raised and the maximum pressure weight is removed from the gas valve to restore the normal or minimum working pressure. It is to be understood, of course, that the gas valve will remain open until a pressure of gas in the tank reaches the predetermined minimum pressure when it will automatically close.

Should a sudden rush of gas enter the tank, the gas valve will raise the lever 31 until it contacts with the foot 30 of the lever 26 and remain there until the minimum pressure is again restored, provided the maximum pressure has not been reached, and should the pressure be increased above the maximum, the valve will open further raising the lever 26 and remain in this position until the maximum pressure is relieved. The additional opening of the valve is permitted by reason of the slidable mounting of the upper end of the rod 22 in the sleeve 23 which permits the rod 23 to move upwardly independently of the rod 22.

From the above it will be seen that my device will automatically control the maximum and minimum gas pressures in the tank dependent upon the liquid level. It is also my intention to have the valve when fully opened at least equal in outlet capacity to the inlet capacity of the inlet pipe 4, so that at no time will the pressure build up in the tank sufficiently to reach a danger point.

I do not desire to limit myself to the use of poppet valves as shown in the drawing, as I may use any other type of valve found suitable for my class of work.

It will be noted from my construction that a sudden influx of gas charged liquid into the tank will cause the float to rise. This will lower the maximum pressure lever, causing it to contact the minimum pressure lever and automatically convert the gas valve from a minimum pressure valve to a maximum pressure valve. If a sudden rush of gas only enters the tank the valve in opening further will cause the minimum pressure lever to contact the maximum pressure and again the gas valve will be automatically converted from a minimum to a maximum pressure valve.

What I claim and desire to secure by Letters Patent is:

1. In an inverse valve control for liquid and gas separators comprising a tank having a liquid and gas inlet, a float-operated lever mechanism carried by said tank, a liquid valve carried by said tank, a connection between said lever mechanism and valve for operating said valve, a gas valve, a minimum pressure lever for holding said gas valve in closed position until a predetermined minimum pressure is reached in said tank, a maximum pressure lever adapted for contact with said minimum pressure lever for effecting an increase of pressure in said tank, and a connection between the float-operated lever mechanism and the maximum pressure lever for normally holding said lever out of contact with said minimum pressure lever.

2. In an inverse valve control for liquid and gas separators including a tank adapted to receive a gas charged liquid, and a liquid valve connected with the tank, a float operable by liquid in the tank to open said liquid valve, a gas valve connected with the tank adapted to open automatically when a minimum gas pressure in said tank is reached, and means rendered effective by said float for automatically holding the gas valve closed as long as the liquid valve is opened but arranged to allow opening of said valve in case the gas pressure within said tank increases above a predetermined maximum.

3. An inverse valve control for liquid and gas separators comprising the combination with a tank adapted to receive a gas charged liquid, a liquid valve and a float-controlled mechanism for operating said valve, of a gas valve connected with the tank, means for holding said gas valve in closed position until a predetermined minimum gas pressure in said tank has been reached, and means operable upon rise of liquid level in the tank adapted to be automatically brought into co-operation with said first mentioned means for holding said gas valve in closed position until a maximum gas pressure is reached.

4. In an inverse valve control for liquid and gas separators, a tank adapted to have a predetermined liquid level and minimum gas pressure therein, a liquid valve connected with the tank, a control mechanism for opening said liquid valve for maintaining said liquid level, a gas valve connected with the tank, means for retaining said gas valve in closed position until said minimum gas pressure is reached, and means controlled by said control mechanism for retaining the gas valve in closed position until a maximum gas pressure has been reached when said liquid level is raised.

5. An inverse valve control for gas separators comprising a gas separator, a liquid valve, means for operating said valve automatically by the rise and fall of liquid in said separator, a minimum gas pressure valve adapted to be operated automatically by gas pressure in said separator, and means for converting said minimum gas pressure valve to operate at a higher pressure automatically when a rise of liquid in the separator occurs to actuate said operating means for opening said liquid valve.

6. In an inverse valve control for liquid and gas separators, a float-operated lever mechanism, a liquid valve, an adjustable rod connecting said lever mechanism and said liquid valve, a gas valve, a minimum pressure lever carried by said gas valve for normally holding said gas valve in closed position, a maximum pressure lever adapted for contact with said minimum pressure lever, an adjustable rod for connecting the float-operated lever mechanism and maximum pressure lever for normally holding said lever out of contact with said minimum pressure lever, there being a sliding connection in said rod to permit said maximum pressure lever to rise independently of said movement of said float-operated lever mechanism.

7. In apparatus of the character described including a tank for receiving a gas charged liquid and having a liquid outlet and a gas outlet, means for controlling flow of liquid from the tank through said liquid outlet when the liquid in the tank reaches a predetermined level, means associated with said gas outlet for normally maintaining a predetermined minimum pressure in said tank, means rendered effective upon actuation of said liquid control means for effecting a predetermined increase of pressure in the tank for establishing pressure on the liquid to enhance its flow through said outlet and operable to relieve said pressure in case of increase in pressure above said predetermined increased pressure.

In testimony whereof I affix my signature.

GWYNNE RAYMOND.